United States Patent
Hertrich

[19]

[11] Patent Number: 6,111,595
[45] Date of Patent: Aug. 29, 2000

[54] RAPID UPDATE VIDEO LINK

[75] Inventor: James P. Hertrich, Arlington Heights, Ill.

[73] Assignee: Northern Information Technology, Arlington Heights, Ill.

[21] Appl. No.: 08/921,861

[22] Filed: Aug. 22, 1997

[51] Int. Cl.⁷ .............................. H04N 7/04; H04N 7/12
[52] U.S. Cl. .............................. 348/22; 348/17; 348/723; 348/725; 348/567; 455/42
[58] Field of Search ............................ 348/22, 723, 17, 348/552, 553, 567, 725, 21; 455/42, 39; H04N 7/04, 7/045, 7/12

[56] References Cited

U.S. PATENT DOCUMENTS

| | | |
|---|---|---|
| 3,037,083 | 5/1962 | Inouye ........................................ 348/22 |
| 3,825,677 | 7/1974 | Kasprzak .................................. 348/22 |
| 3,851,095 | 11/1974 | Kleinerman ............................... 348/22 |
| 4,200,869 | 4/1980 | Murayama et al. . |
| 4,257,043 | 3/1981 | Tsuchiko . |
| 4,317,130 | 2/1982 | Brown ....................................... 358/108 |
| 4,325,063 | 4/1982 | Herman . |
| 4,399,435 | 8/1983 | Urabe . |
| 4,694,406 | 9/1987 | Shibui et al. . |
| 4,796,089 | 1/1989 | Imai et al. ................................ 358/183 |
| 4,816,915 | 3/1989 | Imai et al. ................................ 348/565 |
| 4,910,683 | 3/1990 | Bishop et al. . |
| 4,969,042 | 11/1990 | Houtman et al. . |
| 4,994,913 | 2/1991 | Maeshima ................................. 348/22 |
| 5,063,587 | 11/1991 | Semasa et al. . |
| 5,457,730 | 10/1995 | Rounds . |
| 5,541,640 | 7/1996 | Larson . |
| 5,543,824 | 8/1996 | Priem et al. . |
| 5,557,661 | 9/1996 | Yokoyama . |
| 5,572,691 | 11/1996 | Koudmani . |
| 5,606,361 | 2/1997 | Davidsohn et al. . |
| 5,701,582 | 12/1997 | DeBey ...................................... 345/328 |
| 5,774,186 | 6/1998 | Brodsky et al. ........................ 348/553 |
| 5,801,786 | 9/1998 | Song ......................................... 348/564 |
| 5,926,208 | 7/1999 | Noonen et al. ........................... 348/17 |

OTHER PUBLICATIONS

Principles of Communication Systems by Taub et al, Second Edition 1986, pp. 163–164, Section 4.15, 1986.

Primary Examiner—John K. Peng
Assistant Examiner—Jean W. Désir
Attorney, Agent, or Firm—George H. Gerstman; Shaw Seyfarth

[57] ABSTRACT

A method and apparatus for transmitting video over telephone lines is provided. FM data is produced representative of a video picture to be transmitted and synchronization data concerning the transmitted picture is also produced. The FM data and the synchronization data are transmitted via telephone lines to a receiver. A pair of memories is provided in the receiver. The receiver uses the synchronization data to coordinate the storage and display of the received pictures. One memory displays the picture while the other memory is being loaded. The memories are toggled so that the memory from which the previously stored data is displayed becomes the memory being loaded and the memory being loaded becomes the memory from which previously stored data is displayed. Alternatively, one memory is a load memory while the other memory is a display memory. After the incoming picture is stored in the load memory, it is transferred to the display memory.

6 Claims, 3 Drawing Sheets

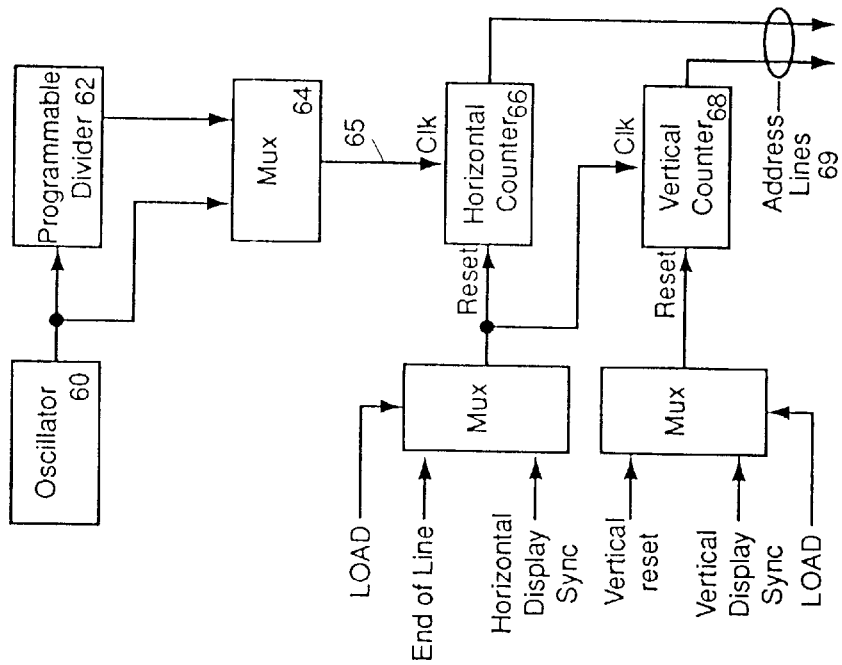
FIG. 4
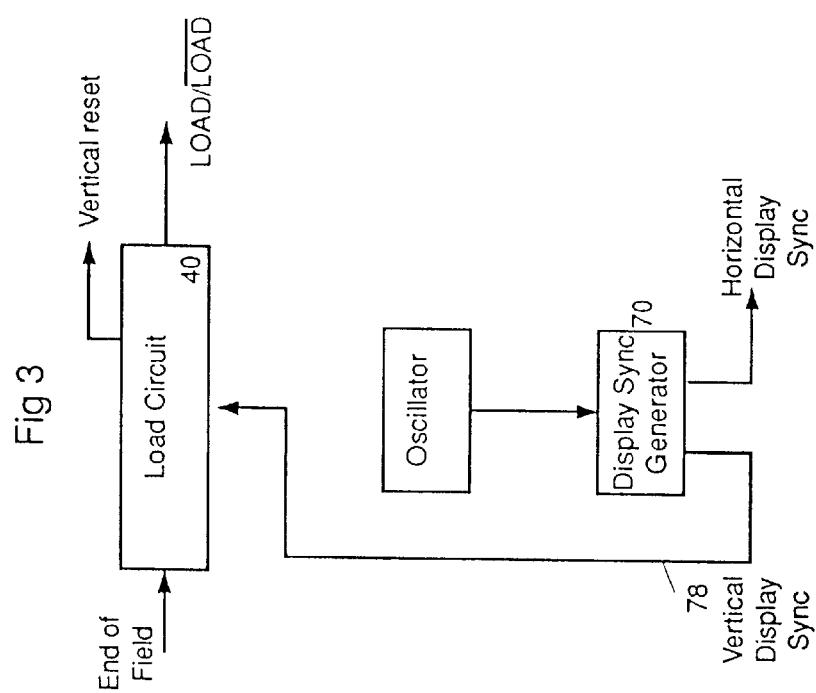
FIG. 3
Fig 3

RAPID UPDATE VIDEO LINK

FIELD OF THE INVENTION

The present invention concerns a novel method and apparatus for transmitting video via frequency modulation (FM).

BACKGROUND OF THE INVENTION

There are several methods in the prior art for transmitting video over limited bandwidth communication paths. One prior art method stored a video picture and then slowly transmitted the video as FM data. The FM data was transmitted using ham radio equipment or dial-up telephone lines operating using audio tones usually from 600 hertz to 2400 hertz. This allowed most video pictures to be sent in approximately 8 to 30 second with resolutions of approximately 128×128 pixels to 256×256 pixels respectively. The picture usually had a 6 bit gray scale, i.e. 64 shades of gray. The picture information was loaded into memory at the transmitter end, at a live video rate, from a standard video source. Once stored, the information was accessed from memory at a much slower rate and in turn fed to a circuit which converted the information into FM data, on the basis of the higher the digital count the higher the frequency. The video information was combined with sync information to signal the receiver unit when a line of information was completed and when a picture was completed. Because complete pictures were sent and video pictures were made up of shades of gray, the FM method worked satisfactorily. If the carrier was slightly distorted or off frequency, it only shifted the gray scale and was basically unnoticeable in the transmitted picture. A memory device was used at each end. The memory took various forms but was typically a memory chip or chips. The output of the memory was either displayed on a built in cathode ray tube (CRT) or was coupled to an external CRT display. As new pictures were sent, the new picture information would scroll down the screen replacing the old information in memory as it was received.

The analog data was found to be advantageous because given any bandwidth and time length, analog data could carry more information than digital data. Consequently, relative to sending video data that has not been compressed, the FM method was considered fast. However, since the systems had been designed to work over the switched telephone network, the frequencies were limited to below 3,000 hertz. In view of this frequency limitation, the FM method became disadvantageous and the digital system became more advantageous with the increasing speed of microprocessors.

The advent of high speed modems and more powerful microprocessors enabled digital systems to develop rapidly. These digital systems use a different method of transmission than the FM transmission method. The digital systems send an initial picture to the receiver unit and then update only the changes in video. Because of the high speed processors and complex algorithms, they are able to get more picture updates over the switched telephone network than is possible using an FM method. For example, they send an initial picture to the receiver and then they update only the changes. Because most still camera pictures do not change significantly, the digital method can give an appearance of providing fast video. Also, compression algorithms are dynamic and can sacrifice resolution for speed if desired.

However, digital transmission has its drawbacks. One drawback is that with large changes in the video picture, the video picture can be slowed down substantially. And while the cost of computers seems to be dropping continuously, computers are still significantly more expensive than the cost of an FM system. We have discovered a method and apparatus for transmitting video as FM data while at the same time obtaining relatively high speed video.

We have found that in order to obtain higher speed video, it is advantageous to avoid the switched telephone network, and to instead use direct copper wire or leased copper line. By avoiding the switched telephone network, much higher frequencies can be transmitted down the wire, allowing substantially greater speed using the FM method. In this manner, updates of several times per second are possible.

It has been found, however, that when a higher speed video is transmitted using a system similar to a system in the prior art, a picture is produced which may be visually annoying. It is, therefore, an object of the invention to provide a method and apparatus for transmitting video using an FM transmission system but obtaining a substantially greater speed than in the prior art.

Another object of the present invention is to transmit video using an FM transmission system while providing for a smooth display of the incoming video picture and alleviating the production of a picture which is visually annoying.

A further object of the present invention is to provide an FM transmission method for transmitting video that is simple and economical in construction and operation.

Other objects and advantages of the present invention will become apparent as the description proceeds.

SUMMARY OF THE INVENTION

In accordance with the present invention, a method for transmitting video is provided. The method comprises the steps of producing FM data representative of a video picture to be transmitted; transmitting the FM data to a receiver; providing two memories; and displaying data that has been loaded into one of the memories while data is being loaded into the other one of the memories.

As used in the specification and claims herein, the term "two memories" includes two separate memory chips or two separate portions of a single memory chip or two separate memories of another configuration or two separate portions of a single memory of another configuration. Further, although two memories or memory sections are illustrated, it is to be understood that the term "two memories" means at least two memories or memory sections and additional memories or memory sections may be used if desired.

In accordance with one embodiment, the first memory and a second memory are toggled so that the memory from which the data is displayed becomes the memory being loaded thereafter and the memory being loaded becomes the memory from which previously stored data is displayed. In another embodiment, the two memories comprise a load memory and display memory, and the method includes the steps of storing the incoming picture in the load memory and thereafter transferring the stored picture from the load memory into the display memory.

In the illustrative embodiment, the step of producing FM data representative of a video picture comprises the steps of storing a video picture in memory and modulating the stored video picture to produce FM picture data representative of the video picture. At the transmitter end, synchronization data concerning the video picture is also produced and is modulated to become FM sync data. The combined FM picture data and the FM sync data are transmitted to a receiver. The combined FM data is decoupled and decoded at the receiver end producing at least two outputs. One of the outputs carries picture data and the other of the outputs carries synchronization data.

In one embodiment, the synchronization data contains an end of picture signal sent from the transmitter which produced the FM data representative of a video picture. Alternatively, the synchronization data comprises the lack of FM information. Still another alternative is one in which the synchronization data comprises a time base in which the data is stored in memory at the end of predetermined time intervals.

In accordance with the present invention, apparatus for transmitting video is provided. The apparatus includes means for producing FM data representative of a video picture to be transmitted. The FM data is transmitted to a receiver and the receiver includes two memories. Means are provided for displaying data that has been loaded into one of the memories while data is being loaded into the other one of the memories.

A more detailed explanation of the invention is provided in the following description and claims, and is illustrated in the accompanying drawings.

DETAILED DESCRIPTION OF THE DRAWINGS

FIG. 3 is a block diagram of a portion of the receiver unit of FIG. 2.

FIG. 4 is a block diagram of the circuit for addressing the memory portion of the receiver unit of FIG. 2.

DETAILED DESCRIPTION OF THE ILLUSTRATIVE EMBODIMENT

Figure 1:
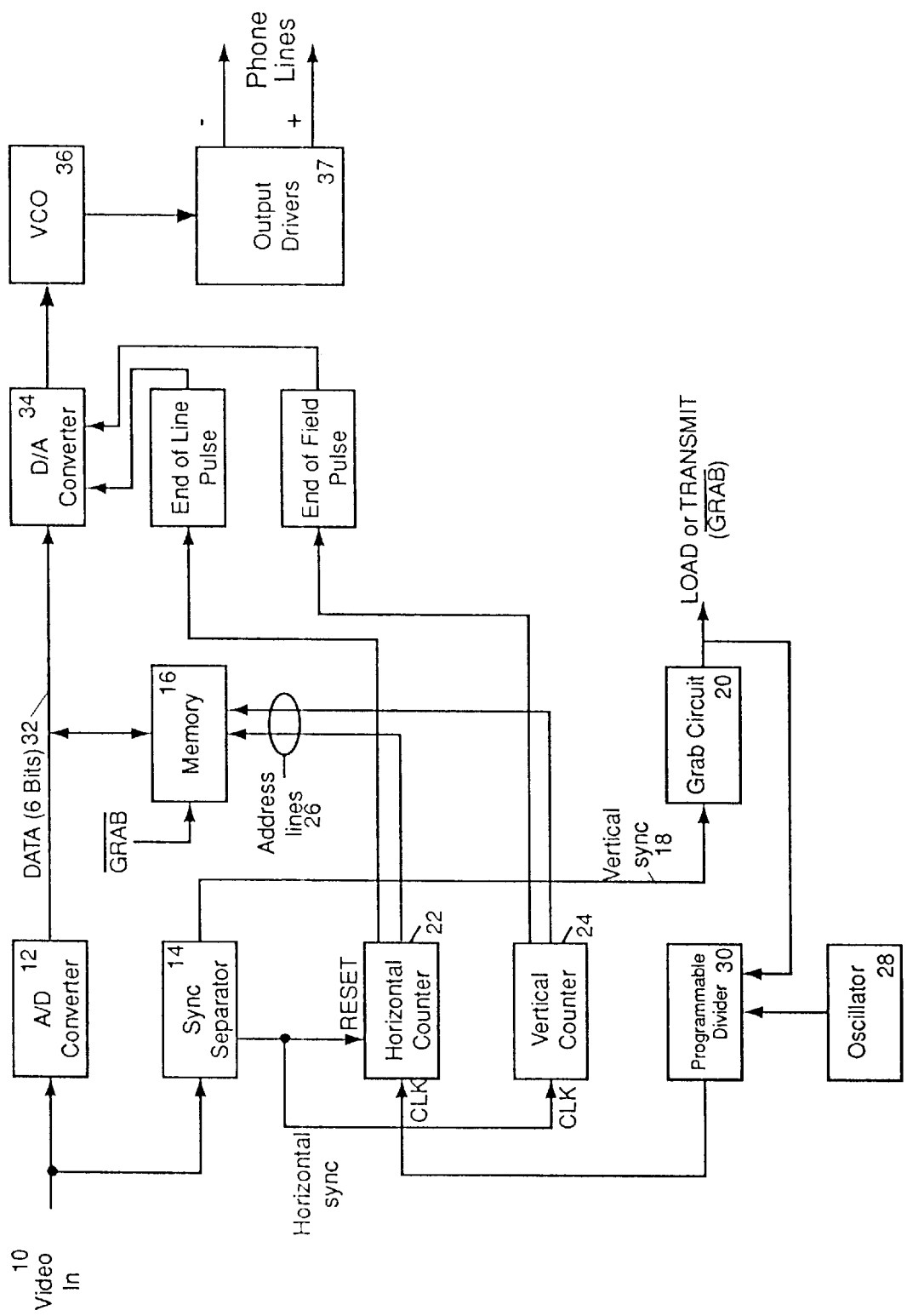
FIG. 1 is a block diagram of a transmitter unit constructed in accordance with the principles of the present invention.

Referring to FIG. 1, a block diagram of a transmitter unit according to the present invention is shown therein. The video signal from a video source such as a video camera, VCR, etc. is introduced at input 10 and is fed to an analog to digital converter (A/D converter) 12 and a sync separator 14. Sync separator 14 produces a horizontal and vertical sync (used for timing purposes). The A/D converter 12 digitizes the video for storage into memory 16.

The process begins with a single video field producing a vertical sync signal 18. This vertical sync signal 18 controls or feeds a grab circuit 20. Grab circuit 20 toggles between two states—load or transmit. The vertical sync signal triggers the grab circuit into the load state first. This load state then enables the A/D converter 12 to store the information in memory 16. It proceeds across the first line. When the end of the first line is hit, a horizontal sync pulse is sought. This horizontal sync pulse in turn resets the horizontal counter 22, used to count pixels in each line. The same horizontal pulse feeds a vertical counter 24, used to count lines, and advances the counter.

Horizontal counter 22 and vertical counter 24 feed the address lines 26 of memory 16. This proceeds as the entire memory 16 is filled and until a second vertical sync pulse is received, signifying the end of the field. This same vertical sync pulse triggers the grab circuit 20 toggling it into a transmit state. In the transmit state, counters 22 and 24 count differently. The oscillator 28 that clocks the counters goes from a live speed for loading the picture into memory, to a slower than live speed for purposes of transmitting the information. This is required because the transmitted information has a limited bandwidth.

An oscillator 28 is provided which feeds a programmable divider 30. Divider 30 also receives a signal from the grab circuit and has a multiplexor (MUX) in it which selects between a high speed oscillator or a programmable presettable divided clock. Programmable divider 30 has a dip switch on it which allows selection of the speed of picture display. Although no limitation is intended, in the illustrative embodiment the speed may be selected for as slow as one per second or as fast as four per second.

When in the transmit state, the grab circuit causes a different clock speed to come into the counters. Grab circuit 20 also controls whether the memory is in a read state or the write state and for transmission purposes the read state is used. When in the read state (transmission) data lines 32 feed a D/A converter 34. D/A converter 34 reconstructs the video section of each line. It starts along line one (counts through line one) and when the counter 22 hits the end of that line, it also triggers a horizontal end of line pulse to be sent to the D/A converter 34. The D/A converter circuit also contains a video amplifier used to combine the video from memory and the end of line pulses and the end of field pulses.

The system advances to the next line. Horizontal counter 22 continues counting across and vertical counter 24 continues advancing. This proceeds as the vertical counter 24 advances after each horizontal line. When the end of the field is reached, vertical counter 24 produces a pulse which in turn causes an end of field pulse to be sent to the D/A converter 34.

D/A converter 34 outputs an analog voltage which causes the voltage-controlled oscillator (VCO) 36 to produce a specific frequency based on the picture where, for example, 140 kilohertz represents a sync signal. As an example, approximately 170 kilohertz would represent the black level in the picture and approximately 260 kilohertz would represent a white level. As the output of D/A converter 34 is clocking into VCO 36, VCO 36 then changes its output frequency depending on the video level. Output drivers 37 send this output frequency via telephone line/twisted pair wire to the receiver unit. As used in the specification and claims, the term "telephone line" includes any type of line utilized for telephone transmission, including but not limited to twisted pair line.

Figure 2:
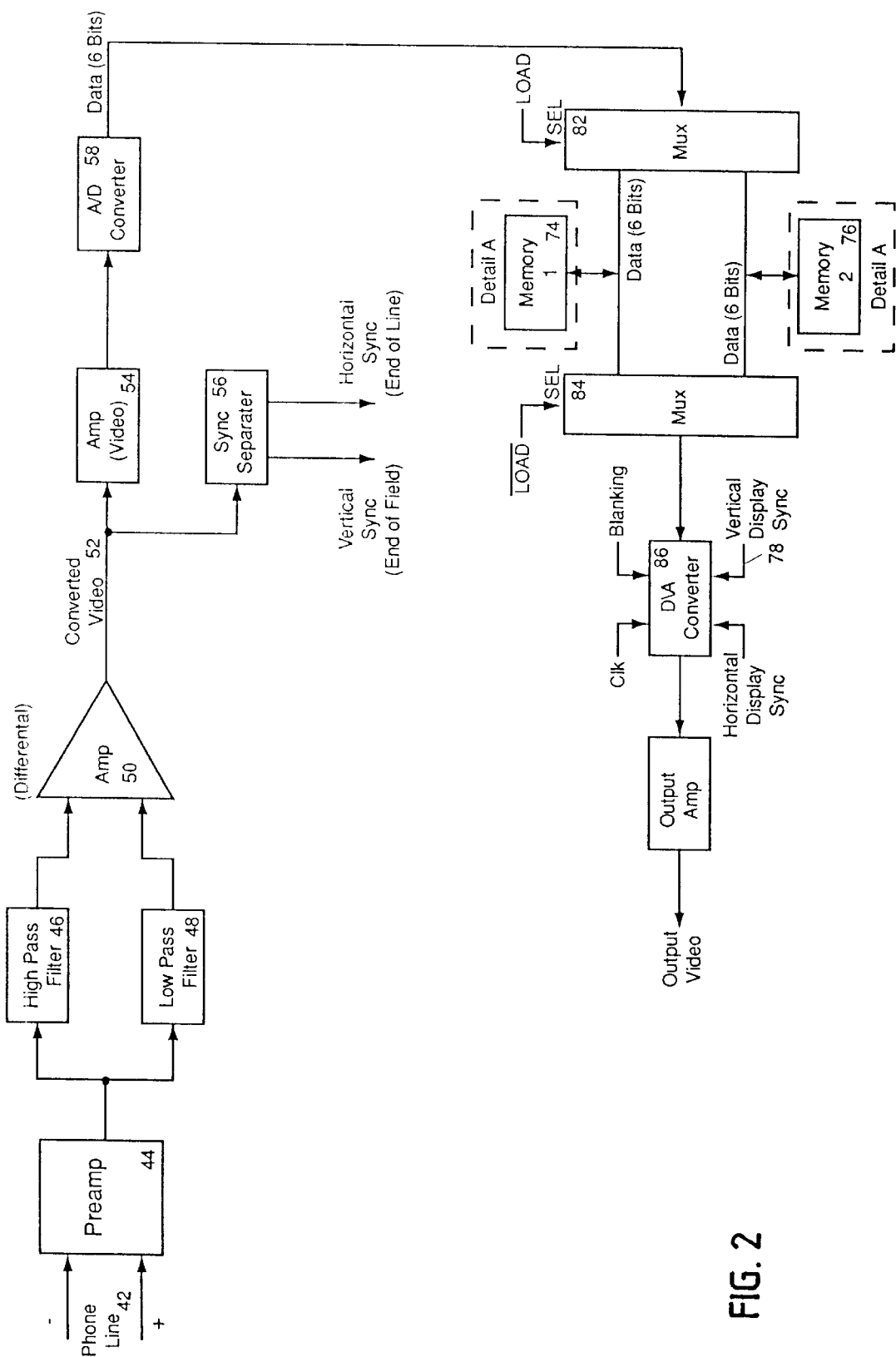
FIG. 2 is a block diagram of a receiver unit constructed in accordance with the principles of the present invention.

The receiver unit is illustrated in FIGS. 2–4. Referring to FIG. 3, the receiver also has a circuit including load circuit 40 which synchronizes the receiver operation. Assume that a field has been completely received and that the system is starting into the receiving of a brand new field. Referring to FIG. 2, the information comes in through phone line 42. Phone line 42 is fed to a preamplifier 44. Preamplifier 44 amplifies the FM deviation from the transmitter unit. That feeds a high pass filter 46 and a low pass filter 48. As the frequency is closer to the high end (e.g. 260 kilohertz), the high pass filter 46 produces a higher voltage and the low pass filter produces a lower voltage. If it is closer to the low end, for example 140 kilohertz, this process reverses.

The information out of each of the filters 46 and 48 feeds into a differential amplifier 50. Differential amplifier 50 recombines the signal and produces an output that is similar to the output of D/A converter 34 as it feeds the VCO 36 in the transmitter. The combination of VCO 36 in the transmitter and the detector circuit 44–50 in the receiver is a preferred method for sending the data down the phone line. Although the output of the D/A converter could be directly coupled to the phone line, it has been found that using VCO 36 and detector circuit 44–50 is superior.

Converted video 52 is similar to the waveform out of D/A converter 34 from the transmitter. Everything relating to VCO 36, the output drivers, preamplifier 44 and the low and high pass filters 46,48 in the amplifier aids the signal in passing through the phone line. However, the information from D/A converter 34 could be directly fed into converted video 52 for operation, although it has been found that such operation may be inferior.

Still referring to FIG. 2, converted video 52 feeds into video amplifier 54 and also into sync separator 56. Sync separator 56 sorts out the end of field pulses from the transmitter and the end of line pulses from the transmitter allowing synchronization of the loading of memory between the transmitter and the receiver. Video amp 54 feeds into A/D converter 58 to provide digital information to feed into memory.

FIG. 4 shows the circuit for addressing the memory chips 74 and 76 which form the memory. Referring to FIG. 4, an oscillator 60 feeds a programmable divider 62 and a MUX section 64. For the purposes of loading, programmable divider 62 has a dip switch allowing it to load memory at the same speed that the transmitter is sending the information. It feeds through MUX section 64 and produces a clock 65 into the horizontal counter 66. Horizontal counter 66 is synchronized by the end of line pulses from the transmitter.

Every end of line pulse from the transmitter in turn feeds the vertical counter 68 to advance the "line address," where the horizontal counter 66 counts through pixel addresses. Output lines from horizontal counter 66 and vertical counter 68 are the address lines for each of memory chips 74 and 76. This proceeds as memory 74 is filled, until the end of field pulse from sync separator 56, which was send from the transmitter unit, causes the load circuit 40 (FIG. 3) to toggle. At that time, load circuit 40 sets and begins to look for an output from an internal display sync generator 70 to toggle. This display sync generator 70 is what maintains the display on the monitor always synchronized so that there is no interference, no flashing of the video, no loss of sync to the display monitor between fields, when the fields toggle.

Referring to FIG. 2, when the display is occurring from either memory 74 and from memory 76, the toggling between these two memories 74,76 occurs during the vertical display sync 78 (FIG. 3). This vertical display sync 78 in turn synchronizes load circuit 40 (FIG. 3) for this toggling transition.

Load circuit 40 is also controlled by end of field information coming from the transmitter. Circuit 40 is set by the end of field from sync separator 56 and then clocked by the display vertical sync to keep a smooth transition between memory fields 74 and 76. it synchronizes switching during the display vertical sync giving a smooth transition between memories. When that occurs, the whole process begins over again loading the memory that has been used for display.

In the preferred embodiment, the system constantly loads one of the two memories 74 and 76, using two multiplexors, MUX 82 and MUX 84. Referring to FIG. 2, MUX 82 and MUX 84 are operated opposite of each other. MUX 82 controls where the incoming video information from the transmitter is sent to—it will either send it to memory 74 or memory 76. MUX 84 is looking at the opposite memory for the purposes of displaying that on the monitor screen. The output of the display memory, whether it be memory 74 or memory 76, feeds into MUX 84 which in turn feeds to a D/A converter 86.

Referring to FIG. 4, when the picture is being displayed, the programmable divider 62 section is bypassed and the oscillator 60 feeds directly into a MUX 64 which allows a higher speed clock to feed the horizontal and vertical counters which count the memory address, both pixel addresses and line addresses, in such a manner as to provide a smooth display on the viewing monitor. This same clock is used to clock D/A converter 86.

With respect to the display memory, there is an oscillator that runs at a live video speed. In accordance with the present invention, 512 pixels are defined to be a line. The oscillator operates at the frequency that would provide the 512 pixels times 60 fields per second. There are 262½ lines per field which are industry standard display. Thus the oscillator would run at least 512×262½×60, which is greater than 8 megahertz.

Still referring to FIG. 4, oscillator 60 which runs at a "live" display speed feeds through a MUX 64 where it is passed directly on through to the horizontal counter 66. Horizontal counter 66 counts up to 512 as described above. When it gets to a count of 512, it then looks for the display horizontal sync to reset the horizontal counter and advance the vertical counter to the next line. Thus the display memory is synchronized to the display sync generator.

Referring to FIG. 2, converted video 52 is fed through video amplifier 54 to A/D converter 58. A/D converter 58 produces six bits of data which are fed to MUX 82. MUX 82 feeds those six bits of data either to memory 74 or memory 76 based on information from the load circuit of FIG. 3. After loading the memory, an end of field pulse is received. The load circuit again toggles. That information is sent out through MUX 84 to D/A converter 86 and out to an output amplifier which outputs standard video for viewing on a monitor.

When memory 74 is being loaded, at the same time memory 76 is being unloaded, but not at the same rate. In other words, memory 76 is feeding out to the lower MUX 84 at a live video rate. It is counting many times faster (for example, 20 times the speed of memory 74) and its counting is synchronized by the display sync generator 70 (FIG. 3). FIG. 4 shows the reset lines to horizontal counter 66 and vertical counter 68. When loading memory, the "end of line pulse" is used. However, during display it resets from the display horizontal sync which comes from display sync generator 70 (FIG. 3).

It can be seen that the present invention utilizes two memory sections for loading and display and an analog method of transmission. As a result, instead of taking a snapshot every five or ten or twenty seconds and transmitting that over the telephone lines, the system of the present invention can, in effect, take a snapshot three times per second or even more often. Further, the number of snapshots or frames per second can be raised by raising the frequency or bandwidth of the transmission signal, but then it can only travel a shorter distance on the telephone transmission line. For example, seven or eight frames per second may be transmitted for a distance of five miles. In using the present invention, it is typical to use three frames per second for a distance of twenty miles.

Although it is preferred to use two MUX's and to swap memories, in another embodiment of the invention a first memory or memory section is dedicated to receiving and storing the incoming information and a second memory is dedicated to displaying the picture. In this alternate design, the first memory is clocked at a load picture rate and a fixed counter clocks the display memory at a live picture rate. The incoming picture is stored in the first memory and after storage is completed, the data is transferred from the first memory or memory area to the second memory or memory area. The information transfer occurs as the display memory displays the next field by addressing both memories with the same memory address or corresponding location. Then, after the display memory outputs old data, the new data is transferred in. After the transfer is completed, the first memory commences receiving the next picture.

It is also understood that various methods for sending synchronization information to the receiver can be used. The primary goal is to coordinate the receiver and the transmitter in order to synchronize the transmitted picture information. While using a discrete end of line or end of picture sync pulse is preferred, another sync method is using the lack of FM information to signify the end of the line or the end of the picture. Another method is to send information based on an accurate time base at both ends. In other words, the picture is sent as one long data stream and the data is stored in memory at predetermined time intervals. In a specific example although no limitation is intended, the data is stored in memory every 2.5 microseconds which equals approximately three pictures per second transmit speed. If both ends use an accurate time base, a discrete end of line or end of picture signal may not need to be sent from the transmitter to the receiver for synchronization.

Although illustrative embodiments of the invention have been shown and described, it is to be understood that various other modifications and substitutions may be made by those skilled in the art without departing from the novel spirit and scope of the present invention.

What is claimed is:

1. A method for transmitting video, comprising the steps of:

providing a video picture to be transmitted;

feeding the picture to a voltage-controlled oscillator;

transmitting a signal from the output of said voltage-controlled oscillator via telephone lines/twisted pair wire to a preamplifier;

feeding the preamplifier output to a high pass filter and a low pass filter;

feeding the information out of said high pass filter and said low pass filter to a differential amplifier for recombining the signal and producing an output that is similar to the picture information fed to said voltage-controlled oscillator;

providing two memories and displaying data that has been loaded into one of said memories while data is being loaded into the other one of said memories.

2. A method as defined in claim 1, in which said one memory and said other memory are toggled so that the memory from which the data is displayed becomes the memory being loaded thereafter and the memory being loaded becomes the memory from which previously stored data is displayed.

3. A method for transmitting video, comprising the steps of:

providing a video picture to be transmitted;

feeding the picture to a first circuit for providing an output which changes in frequency depending on the level of the video;

transmitting a signal from said output via electrical conductor to a high pass filter and a low pass filter;

feeding the information out of said high pass filter and said low pass filter to a differential amplifier for recombining the signal and producing an output that is similar to the picture information fed to said first circuit;

providing two memories and displaying data that has been loaded into one of said memories while data is loaded into the other one of said memories.

4. A method as defined in claim 3, in which said one memory and said other memory are toggled so that the memory from which the data is displayed becomes the memory being loaded thereafter and the memory being loaded becomes the memory from which previously stored data is displayed.

5. A method for transmitting video, comprising the steps of:

providing a video picture to be transmitted;

feeding the picture to a voltage controlled oscillator for providing an output which changes in frequency depending on the level of the video;

transmitting a signal from said output via telephone lines/twisted pair to a frequency to voltage converter having an output that is fed to a differential amplifier for recombining the signal and producing an output that is similar to the picture information fed to said voltage controlled oscillator;

providing two memories and displaying data that has been loaded into one of said memories while data is loaded into the other one of said memories.

6. A method as defined in claim 5, in which said one memory and said other memory are toggled so that the memory from which the data is displayed becomes the memory being loaded thereafter and the memory being loaded becomes the memory from which previously stored data is displayed.

* * * * *